United States Patent
Kim et al.

(10) Patent No.: US 11,219,015 B2
(45) Date of Patent: Jan. 4, 2022

(54) METHOD FOR TRANSMITTING/RECEIVING SIGNAL IN WIRELESS COMMUNICATION SYSTEM, AND DEVICE THEREFOR

(71) Applicant: LG ELECTRONICS INC., Seoul (KR)

(72) Inventors: Youngtae Kim, Seoul (KR); Yunjung Yi, Seoul (KR); Daesung Hwang, Seoul (KR); Duckhyun Bae, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/638,123

(22) PCT Filed: Aug. 13, 2018

(86) PCT No.: PCT/KR2018/009262
§ 371 (c)(1),
(2) Date: Feb. 10, 2020

(87) PCT Pub. No.: WO2019/031944
PCT Pub. Date: Feb. 14, 2019

(65) Prior Publication Data
US 2020/0245324 A1    Jul. 30, 2020

Related U.S. Application Data

(60) Provisional application No. 62/543,985, filed on Aug. 11, 2017.

(51) Int. Cl.
*H04W 72/04* (2009.01)
*H04L 5/14* (2006.01)
(Continued)

(52) U.S. Cl.
CPC ....... *H04W 72/0426* (2013.01); *H04L 5/0051* (2013.01); *H04L 5/1469* (2013.01);
(Continued)

(58) Field of Classification Search
None
See application file for complete search history.

(56) References Cited

U.S. PATENT DOCUMENTS

2013/0288683 A1* 10/2013 Kang .................... H04W 36/06
455/436
2014/0301301 A1* 10/2014 Cheng ....................... H04L 5/00
370/329

(Continued)

OTHER PUBLICATIONS

PCT International Application No. PCT/KR2018/009262, Written Opinion of the International Searching Authority dated Dec. 6, 2018, 21 pages.

(Continued)

*Primary Examiner* — Gregory B Sefcheck
*Assistant Examiner* — Suk Jin Kang
(74) *Attorney, Agent, or Firm* — Lee Hong Degerman Kang Waimey

(57) ABSTRACT

A method, according to one embodiment of the present invention, may comprise a configuration whereby a base station, which has received, from another base station, a message including information associated with the another base station, communicates with a terminal on a specific frequency band on the basis of the information associated with the another base station. Here, the specific frequency band may be: a frequency band included in a frequency band used by the another base station; or a frequency band adjacent to the frequency band used by the another base station.

15 Claims, 12 Drawing Sheets

(51) Int. Cl.
*H04L 25/02* (2006.01)
*H04W 4/06* (2009.01)
*H04W 8/00* (2009.01)
*H04W 56/00* (2009.01)
*H04W 74/08* (2009.01)
*H04L 5/00* (2006.01)

(52) U.S. Cl.
CPC ......... *H04L 25/0226* (2013.01); *H04W 4/06* (2013.01); *H04W 8/005* (2013.01); *H04W 56/0045* (2013.01); *H04W 72/0453* (2013.01); *H04W 74/0833* (2013.01)

(56) References Cited

U.S. PATENT DOCUMENTS

| | | | | |
|---|---|---|---|---|
| 2015/0189574 A1* | 7/2015 | Ng | ............... | H04W 24/08 370/252 |
| 2015/0223149 A1* | 8/2015 | Liu | ............... | H04W 24/08 370/252 |
| 2015/0223156 A1* | 8/2015 | Park | ............... | H04L 5/0073 370/252 |
| 2015/0223245 A1* | 8/2015 | Cheng | ............... | H04J 11/0069 370/329 |
| 2015/0271744 A1* | 9/2015 | Liu | ............... | H04L 5/005 370/329 |
| 2015/0327233 A1* | 11/2015 | Liu | ............... | H04W 72/0406 370/329 |
| 2016/0043843 A1* | 2/2016 | Liu | ............... | H04L 5/0048 370/329 |
| 2016/0088500 A1* | 3/2016 | Chen | ............... | H04L 5/0092 370/280 |
| 2016/0105897 A1* | 4/2016 | Liu | ............... | H04W 72/1226 370/235 |
| 2016/0234706 A1* | 8/2016 | Liu | ............... | H04W 72/0453 |
| 2016/0302230 A1* | 10/2016 | Novlan | ............... | H04J 11/0023 |
| 2017/0013671 A1* | 1/2017 | Xu | ............... | H04W 52/0206 |
| 2017/0078955 A1* | 3/2017 | Cheng | ............... | H04W 56/001 |
| 2017/0142751 A1* | 5/2017 | Liu | ............... | H04L 5/0092 |
| 2017/0150427 A1* | 5/2017 | Cheng | ............... | H04L 5/005 |
| 2017/0238320 A1* | 8/2017 | Fukuta | ............... | H04W 72/04 370/329 |
| 2017/0324499 A1* | 11/2017 | Liao | ............... | H04L 5/0007 |
| 2017/0374562 A1* | 12/2017 | Jeon | ............... | H04W 76/15 |
| 2018/0041906 A1* | 2/2018 | Jang | ............... | H04W 24/10 |
| 2018/0097771 A1* | 4/2018 | Liu | ............... | H04L 51/28 |
| 2018/0167921 A1* | 6/2018 | Liu | ............... | H04L 5/0053 |
| 2018/0192404 A1* | 7/2018 | Maaref | ............... | H04L 5/0048 |
| 2018/0192412 A1* | 7/2018 | Novlan | ............... | H04L 5/0048 |
| 2018/0213491 A1* | 7/2018 | Liu | ............... | H04W 72/0406 |
| 2018/0219661 A1* | 8/2018 | Liu | ............... | H04W 56/0015 |
| 2018/0263059 A1* | 9/2018 | Rosa | ............... | H04W 74/0833 |
| 2019/0053142 A1* | 2/2019 | Cheng | ............... | H04J 11/0069 |
| 2019/0059056 A1* | 2/2019 | Islam | ............... | H04W 68/005 |
| 2019/0089498 A1* | 3/2019 | Pelletier | ............... | H04L 5/0053 |
| 2019/0207663 A1* | 7/2019 | Shimezawa | ............... | H04W 72/042 |
| 2019/0230574 A1* | 7/2019 | Novlan | ............... | H04L 27/0006 |
| 2019/0334666 A1* | 10/2019 | Damnjanovic | ............... | H04L 5/0012 |
| 2020/0137720 A1* | 4/2020 | Xue | ............... | H04W 56/001 |
| 2020/0162975 A1* | 5/2020 | Mochizuki | ............... | H04W 36/0085 |
| 2020/0205156 A1* | 6/2020 | Adjakple | ............... | H04W 74/0833 |
| 2020/0296761 A1* | 9/2020 | Liu | ............... | H04L 5/0053 |
| 2020/0367212 A1* | 11/2020 | Maaref | ............... | H04L 5/0048 |
| 2021/0014870 A1* | 1/2021 | Kim | ............... | H04W 72/085 |

OTHER PUBLICATIONS

Samsung, "LTE-NR coexistence for DL", 3GPP TSG Ran WG1 Meeting #89, R1-1708061, May 2017, 3 pages.

Huawei, et al., "Overview of NR UL for LTE-NR coexistence", 3GPP TSG Ran WG1 Meeting #89, R1-1709383, May 2017, 15 pages.

Samsung, "DL and UL Assignment for NR TDD", 3GPP TSG Ran WG1 Meeting #89, R1-1708000, May 2017, 3 pages.

LG Electronics, "Discussion on large duplex gap between DL and UL for LTE UL sharing", 3GPP TSG Ran WG1 Meeting #89, R1-1707680, May 2017, 3 pages.

NTT DOCOMO, "MCG/SCG configuration for LTE-NR Dual Connectivity", 3GPP TSG Ran WG2 Meeting #98, R2-1704192, May 2017, 8 pages.

\* cited by examiner

[FIG. 1]
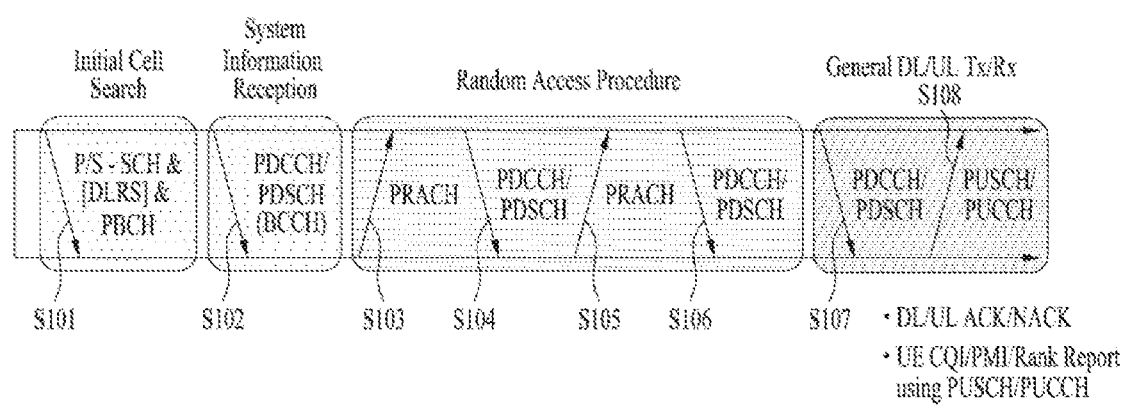

[FIG. 2]
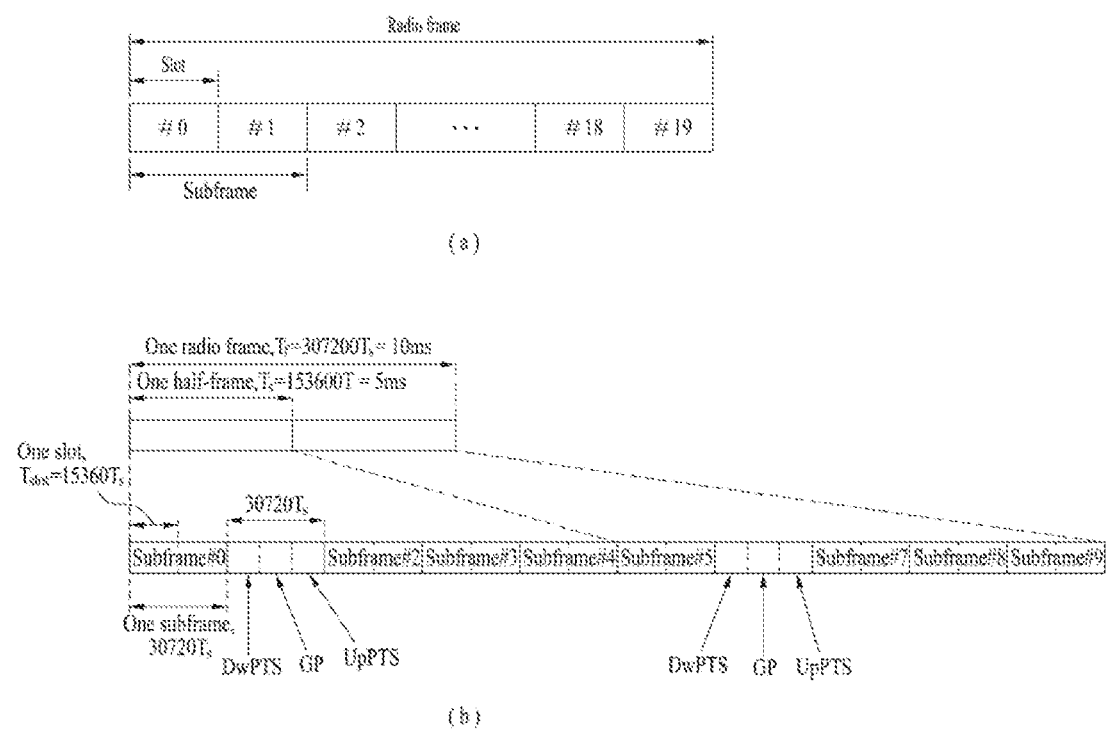

[FIG. 3]
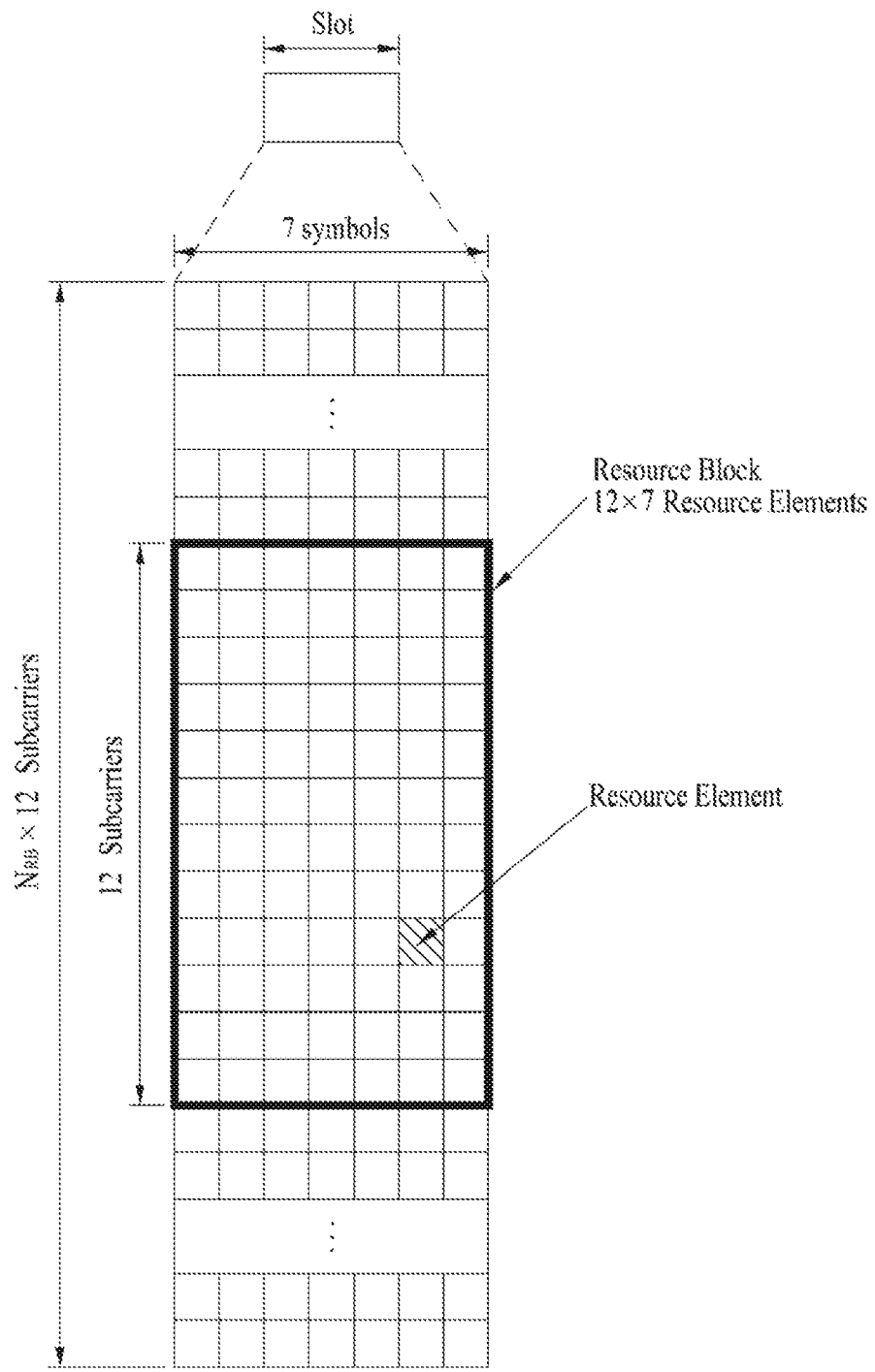

[FIG. 4]
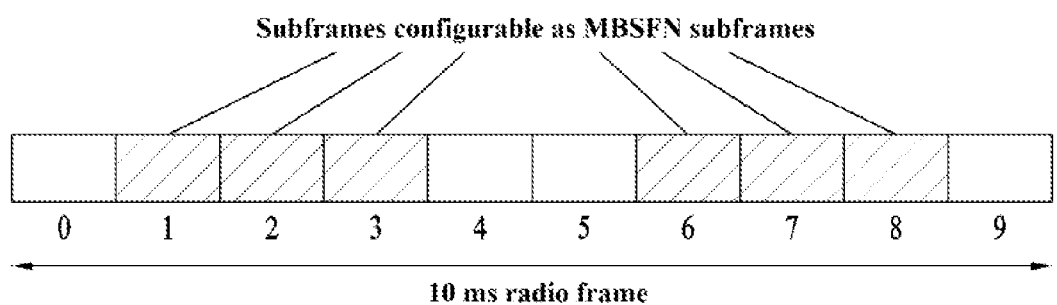

[FIG. 5]
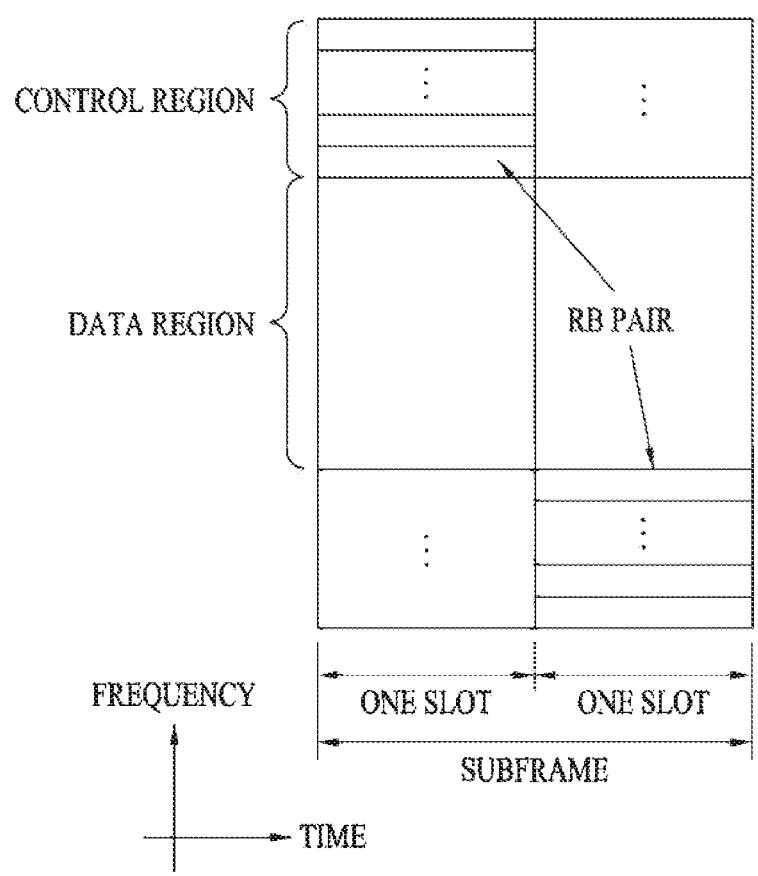

[FIG. 6]
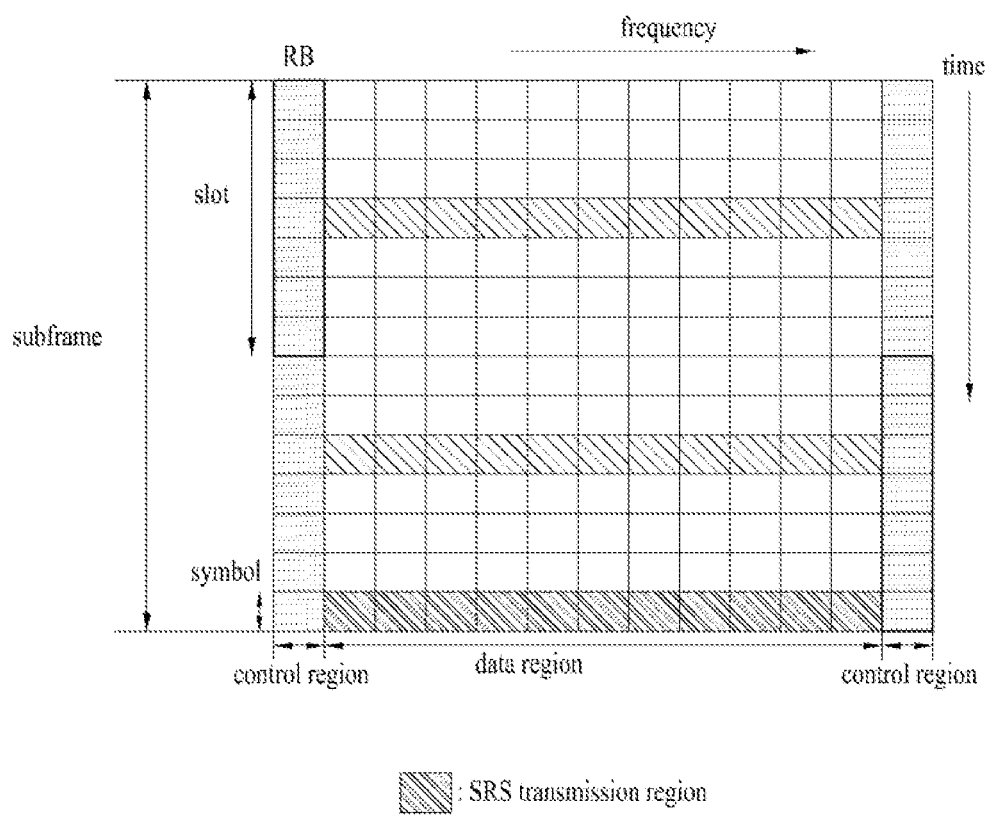

[FIG. 7]
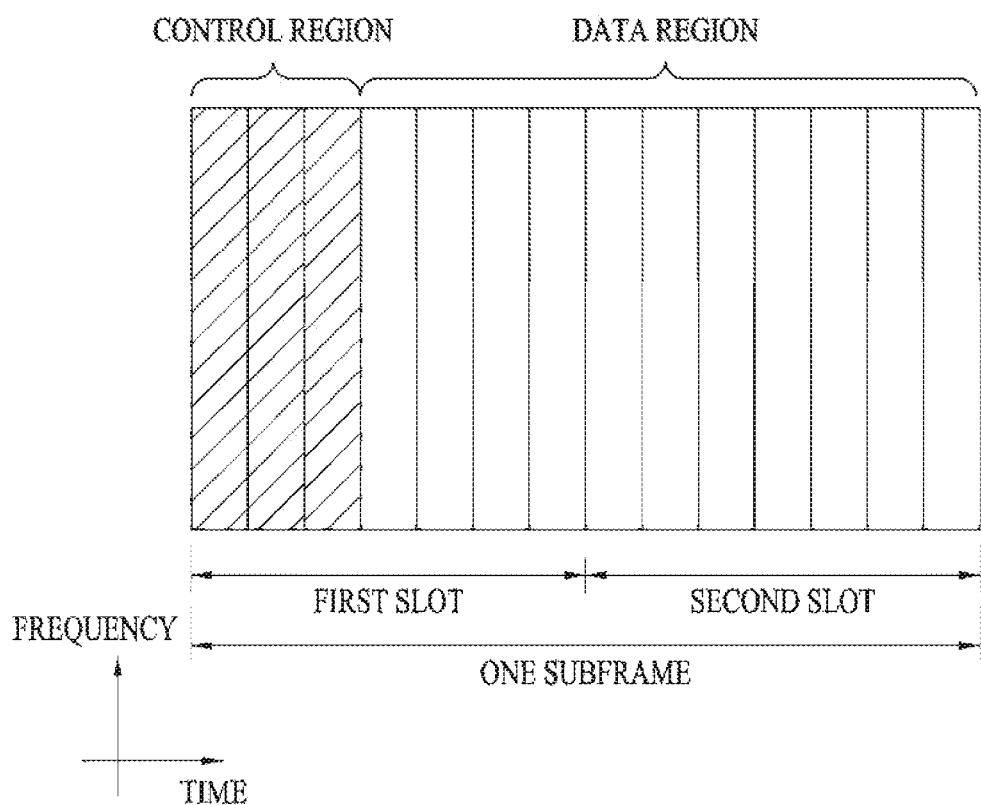

【FIG. 8】
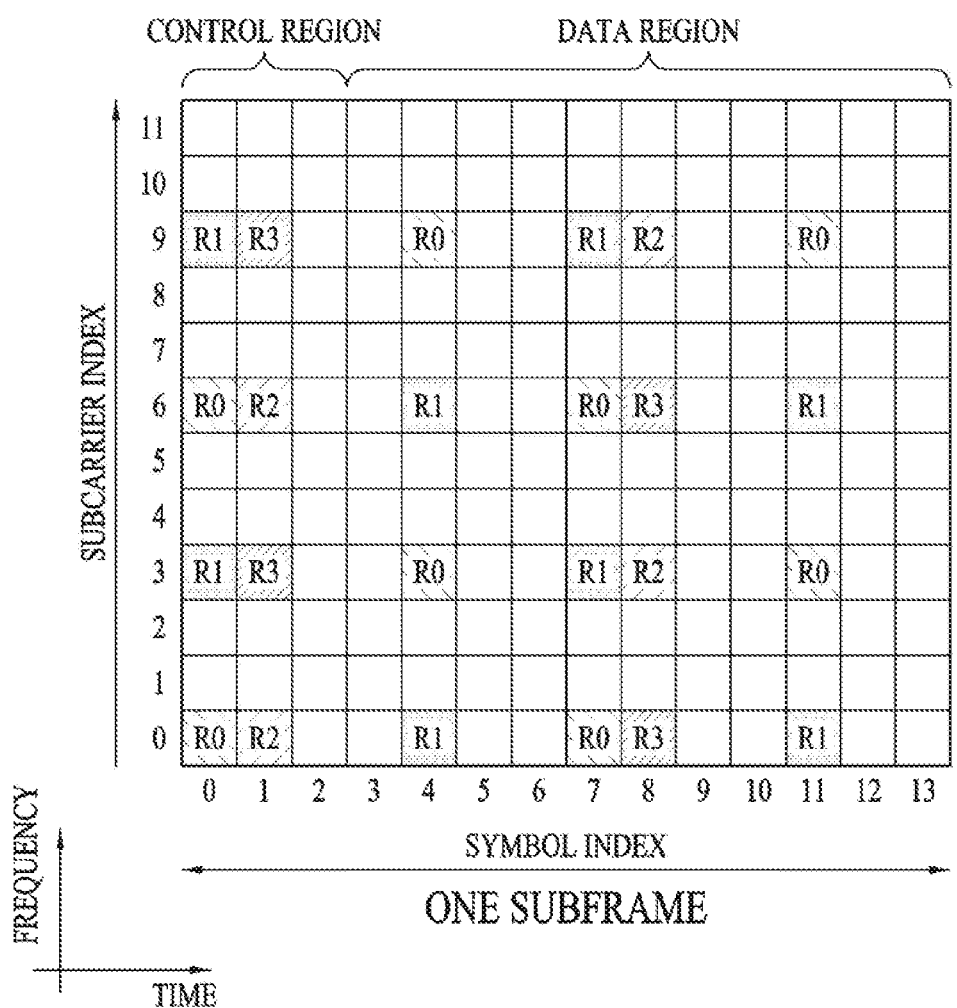

[FIG. 9]
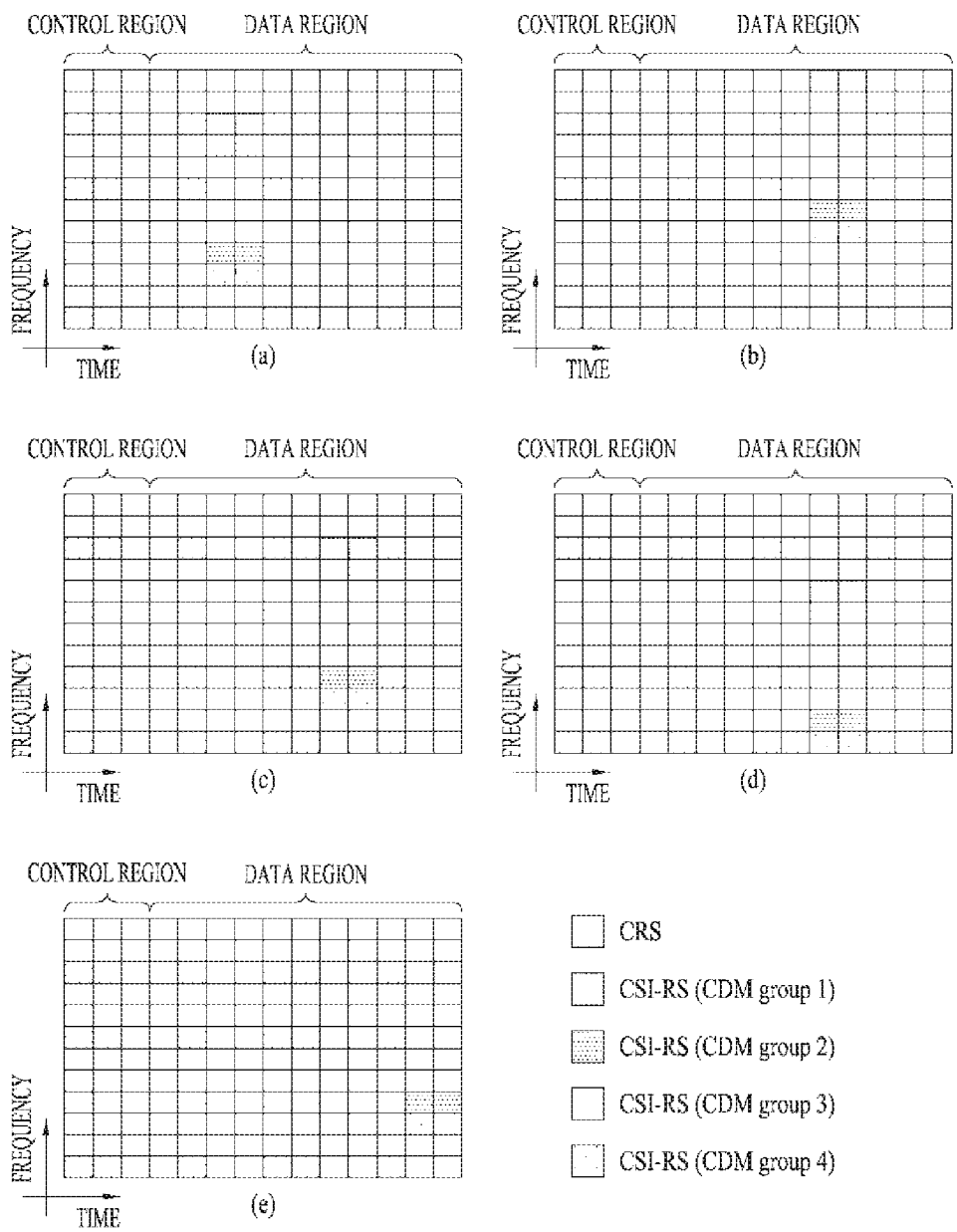

[FIG. 10]

[FIG. 11]
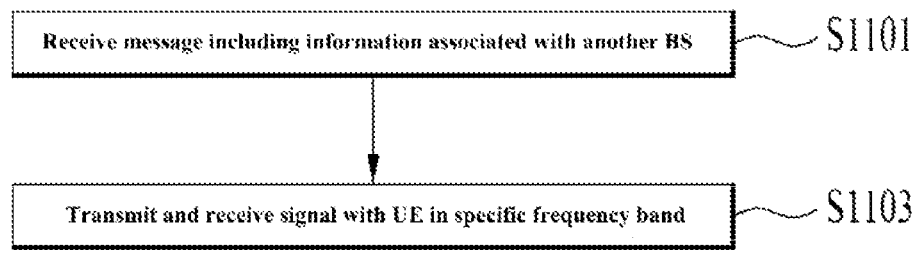

[FIG. 12]
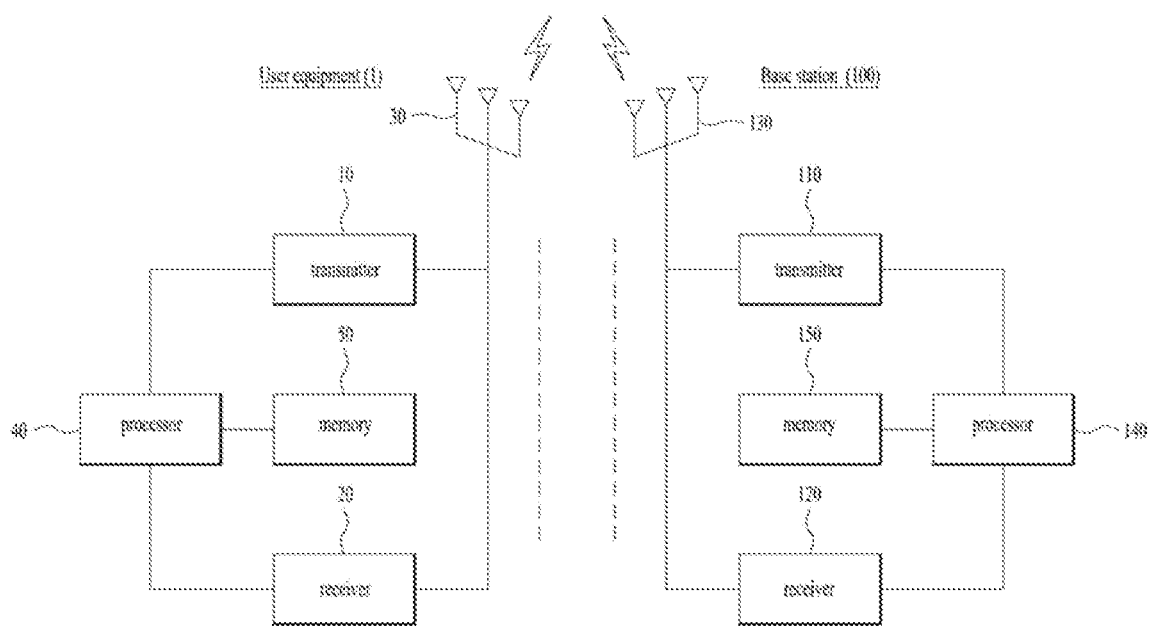

METHOD FOR TRANSMITTING/RECEIVING SIGNAL IN WIRELESS COMMUNICATION SYSTEM, AND DEVICE THEREFOR

CROSS-REFERENCE TO RELATED APPLICATIONS

[0] This application is the National Stage filing under 35 U.S.C. 371 of International Application No. PCT/KR2018/009262, filed on Aug. 13, 2018, which claims the benefit of U.S. Provisional Application No. 62/543,985, filed on Aug. 11, 2017, the contents of which are all hereby incorporated by reference herein in their entirety.

TECHNICAL FIELD

The following description relates to a wireless communication system and, more particularly, to a method of transmitting and receiving a signal between a base station and a user equipment when a new wireless communication system to which various numerologies are applicable and a legacy long-term evolution (LTE) system coexist, and an apparatus supporting the same.

BACKGROUND ART

Machine-to-machine (M2M) communication, machine type communication (MTC), and various devices, such as smartphones or tablet personal computers (PCs), and techniques that require a high data transfer rate have appeared and come into widespread use. This has rapidly increased the quantity of data which needs to be processed in a cellular network. In order to satisfy such rapidly increasing data throughput, various technologies such as carrier aggregation technology for efficiently using more frequency bands, cognitive ratio technology, multi-antenna technology for increasing data capacity in a restricted frequency, multi-base station (BS) cooperative technology, and the like have been developed.

As more communication devices have demanded higher communication capacity, there has been necessity of enhanced mobile broadband (eMBB) communication relative to legacy radio access technology (RAT). In addition, massive machine type communication (mMTC) for providing various services at anytime and anywhere by connecting a plurality of devices and objects to each other is one of main issues to be considered in next-generation communication. Moreover, design of a communication system considering services/UEs sensitive to reliability and latency has been proposed.

In addition, a communication system to be designed in consideration of services/UEs sensitive to reliability and latency is under discussion. Introduction of next-generation RAT has been discussed by taking into account eMBB communication, mMTC, ultra-reliable and low latency communication (URLLC), and the like.

DETAILED DESCRIPTION OF THE DISCLOSURE

Technical Problems

An object of the present disclosure is to provide a method and apparatus for efficiently using a frequency band through message transmission and reception between two base stations in a wireless communication system.

Objects of the present disclosure are not limited to what has been particularly described hereinabove and other objects may be inferred from embodiments of the present disclosure.

Technical Solutions

The present disclosure provides a method and apparatuses for transmitting and receiving a signal between a user equipment and a plurality of base stations in a wireless communication system.

According to an aspect of the present disclosure, provided herein is a method of transmitting and receiving a signal by a base station (BS) in a wireless communication system, including: receiving a message including information associated with another BS from the other BS; and communicating with a user equipment (UE) in a specific frequency band based on the information associated with the other BS, wherein the specific frequency band is a frequency band included in a frequency band used by the other BS or is a frequency band adjacent to the frequency band used by the other BS.

The information associated with the other BS may include one or more of: information about ON and OFF of a small cell connected to the other BS; information about one or more of a discovery reference signal (DRS) configuration, a multimedia broadcast multicast service single frequency network (MBSFN) configuration, a sounding reference signal (SRS) configuration, a time division duplex (TDD) uplink/downlink (UL/DL) configuration, the number of common reference signal (CRS) antenna ports, and a channel state information-reference signal (CSI-RS) configuration of the other BS; information about a synchronization timing or a synchronization offset between the BS and the other BS; information about one or more of a physical random access channel (RACH) resource region, a physical uplink control channel (PUCCH) resource region, and a physical downlink control channel (PDCCH) resource region, allocated by the other BS; and information related to a timing advance (TA) value of the UE, measured by the other BS.

The information associated with the other BS may include information about a reserved resource region defined by the other BS.

The information associated with the other BS may include one or more of information about a resource determined by the other BS to be usable by the BS and information about a resource determined by the other BS not to be usable by the BS.

The method may further include transmitting a message including the information associated with the other BS to the UE.

The method may further include transmitting a message including information about a resource to be used for communication with the UE to the other BS.

In another aspect of the present disclosure, provided herein is a base station (BS) for transmitting and receiving a signal in a wireless communication system, including: a transmitter and a receiver; and a processor, wherein the processor controls the receiver to receive a message including information associated with another BS from the other BS, and controls the transmitter or receiver to communicate with a user equipment (UE) in a specific frequency band based on the information associated with the other BS, and wherein the specific frequency band is a frequency band included in a frequency band used by the other BS or is a frequency band adjacent to the frequency band used by the other BS.

The information associated with the other BS may include one or more of: information about ON and OFF of a small cell connected to the other BS; information about one or more of a discovery reference signal (DRS) configuration, a multimedia broadcast multicast service single frequency network (MBSFN) configuration, a sounding reference signal (SRS) configuration, a time division duplex (TDD) uplink/downlink (UL/DL) configuration, the number of common reference signal (CRS) antenna ports, and a channel state information-reference signal (CSI-RS) configuration of the other BS; information about a synchronization timing or a synchronization offset between the BS and the other BS; information about one or more of a physical random access channel (RACH) resource region, a physical uplink control channel (PUCCH) resource region, and a physical downlink control channel (PDCCH) resource region, allocated by the other BS; and information related to a timing advance (TA) value of the UE, measured by the other BS.

The information associated with the other BS may include information about a reserved resource region defined by the other BS.

The information associated with the other BS may include one or more of information about a resource determined by the other BS to be usable by the BS and information about a resource determined by the other BS not to be usable by the BS.

The processor may control the transmitter to transmit a message including the information associated with the other BS to the UE.

The processor may control the transmitter to transmit a message including information about a resource to be used for communication with the UE to the other BS.

In another aspect of the present disclosure, provided herein is a method of transmitting and receiving a signal by a user equipment (UE) in a wireless communication system, including: receiving an indication of a resource to be used for communication with a base station (BS) from the BS; and communicating with the BS in a specific frequency band based on the indication of the resource to be used for communication with the BS, wherein the resource to be used for communication with the BS is determined based on a message including information associated with another BS, and wherein the specific frequency band is a frequency band included in a frequency band used by the other BS or is a frequency band adjacent to the frequency band used by the other BS.

In another aspect of the present disclosure, provided herein is a user equipment (UE) for transmitting and receiving a signal in a wireless communication system, including: a transmitter and a receiver; and a processor, wherein the processor controls the receiver to receive an indication of a resource to be used for communication with a base station (BS) from the BS, and controls the transmitter or the receiver to communicate with the BS in a specific frequency band based on the indication of the resource to be used for communication with the BS, wherein the resource to be used for communication with the BS is determined based on a message including information associated with another BS, and wherein the specific frequency band is a frequency band included in a frequency band used by the other BS or is a frequency band adjacent to the frequency band used by the other BS.

It will be understood by those skilled in the art that the above-described aspects of the present disclosure are merely part of the embodiments of the present disclosure and various modifications and alternatives could be developed from the following technical features of the present disclosure.

Advantageous Effects

According to an embodiment of the present disclosure, a BS may efficiently transmit and receive a signal to and from a UE in a frequency band used by another BS or in a frequency band adjacent to the frequency band used by the other BS.

Effects of the present disclosure are not limited to what has been particularly described hereinabove and other effects may be inferred from embodiments of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 1 is a diagram illustrating physical channels and a signal transmission method using the physical channels.

FIG. 2 is a diagram illustrating exemplary radio frame structures.

FIG. 3 is a diagram illustrating an exemplary resource grid for a downlink slot.

FIG. 4 is a diagram illustrating exemplary subframes that may be configured as a multimedia broadcast multicast service single frequency network (MBSFN) subframe in an LTE system.

FIG. 5 is a diagram illustrating an exemplary structure of an uplink subframe that may be used in the LTE system.

FIG. 6 is a diagram illustrating exemplary SRS transmission in an uplink subframe that may be used in the LTE system.

FIG. 7 is a diagram illustrating an exemplary structure of a downlink subframe that may be used in the LTE system.

FIG. 8 is a diagram illustrating an exemplary common reference signal (CRS) pattern that may be used in the LTE system.

FIG. 9 is a diagram illustrating exemplary channel state information-reference signal (CSI-RS) patterns that may be used in the LTE system.

FIG. 10 is a diagram illustrating an exemplary zero power (ZP) CSI-RS pattern that may be used in the LTE-A system.

FIG. 11 is a conceptual diagram of a signal transmission and reception method according to embodiments of the present disclosure.

FIG. 12 is a diagram illustrating the configurations of a UE and a BS for implementing the proposed embodiments.

BEST MODE FOR CARRYING OUT THE DISCLOSURE

The embodiments described below correspond to predetermined combinations of elements and features and characteristics of the present disclosure. Moreover, unless mentioned otherwise, the characteristics of the present disclosure may be considered as optional features of the present disclosure. Herein, each element or characteristic of the present disclosure may also be operated or performed without being combined with other elements or characteristics of the present disclosure. Alternatively, the embodiment of the present disclosure may be realized by combining some of the elements and/or characteristics of the present disclosure. Additionally, the order of operations described according to the embodiment of the present disclosure may be varied. Furthermore, part of the configuration or characteristics of any one specific embodiment of the present disclosure may also be included in (or shared by) another embodiment of the present disclosure, or part of the configuration or characteristics of any one embodiment of the present disclosure may replace the respective configuration or characteristics of another embodiment of the present disclosure.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term UE may be replaced with a UE, a Mobile Station (MS), a Subscriber Station (SS), a Mobile Subscriber Station (MSS), a mobile UE, an Advanced Mobile Station (AMS), etc.

A transmission end is a fixed and/or mobile node that provides a data service or a voice service, and a reception end is a fixed and/or mobile node that receives a data service or a voice service. Therefore, in uplink (UL) transmission, a UE may serve as a transmission end, and a BS may serve as a reception end. Likewise, in downlink (DL) transmission, a UE may serve as a reception end, and a BS may serve as a transmission end.

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP LTE system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 36,423, 3GPP TS 38.211, 3GPP TS 38.212, 3GPP TS 38.213, 3GPP TS 38.321, 3GPP TS 38.331, and 3GPP TS 38.423. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The following embodiments of the present disclosure can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like.

CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA).

UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| | | Normal cyclic prefix in downlink | | | Extended cyclic prefix in downlink | | |
| --- | --- | --- | --- | --- | --- | --- | --- |
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |

TABLE 1-continued

| | Normal cyclic prefix in downlink | | | Extended cyclic prefix in downlink | |
| --- | --- | --- | --- | --- | --- |
| | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

FIG. 3 illustrates an exemplary structure of a resource grid for a DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of a UL slot may be the same as that of the DL slot.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present disclosure, for simplicity, this technology will be referred to as New RAT or NR (New Radio).

2.1. Numerologies

The NR system to which the present disclosure is applicable supports various OFDM numerologies as shown in Table 2 below. The value of μ and cyclic prefix information per carrier bandwidth part can be signaled for DL and UL, respectively. For example, the value of μ and cyclic prefix information for DL carrier bandwidth part may be signaled though higher layer signaling such as DL-BWP-mu and DL-MWP-cp. As another example, the value of μ and cyclic prefix information for UL carrier bandwidth part may be signaled though higher layer signaling such as UL-BWP-mu and UL-MWP-cp.

TABLE 2

| μ | $\Delta f = 2^\mu \cdot 15$[kHz] | Cyclic prefix |
| --- | --- | --- |
| 0 | 15 | Normal |
| 1 | 30 | Normal |

TABLE 2-continued

| μ | $\Delta f = 2^\mu \cdot 15$[kHz] | Cyclic prefix |
| --- | --- | --- |
| 2 | 60 | Normal, Extended |
| 3 | 120 | Normal |
| 4 | 240 | Normal |

2.2. Frame Structure

DL and UL transmission are configured with frames each having a length of 10 ms. Each frame may include 10 subframes, each having a length of 1 ms. In this case, the number of consecutive OFDM symbols in each subframe is $N_{symb}^{subframe,\mu} = N_{symb}^{slot} N_{slot}^{subframe,\mu}$.

Each frame may include two half-frames with the same size. In this case, the two half-frames may include subframes 0 to 4 and subframes 5 to 9, respectively.

Regarding the subcarrier spacing slots may be numbered within one subframe in ascending order as follows: $n_s^\mu \in \{0, \ldots, N_{slot}^{subframe, \mu}-1\}$ and may also be numbered within a frame in ascending order as follow: $n_{s,f}^\mu \in \{0, \ldots, N_{slot}^{frame,\mu}-1\}$. In this case, the number of consecutive OFDM symbols in one slot ($N_{symb}^{slot}$) may be determined as shown in Tables 3 and 4 below according to the cyclic prefix. The start slot ($n_s^\mu$) of a subframe is aligned with the start OFDM symbol ($n_s^\mu N_{symb}^{slot}$) of the corresponding subframe in the time domain. Table 3 shows the number of OFDM symbols in each slot/frame/subframe in the case of a normal cyclic prefix, and Table 4 shows the number of OFDM symbols in each slot/frame/subframe in the case of an extended cyclic prefix.

TABLE 3

| μ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 4

| μ | $N_{symb}^{slot}$ | $N_{slot}^{frame, \mu}$ | $N_{slot}^{subframe, \mu}$ |
| --- | --- | --- | --- |
| 2 | 12 | 40 | 4 |

3. Proposed Embodiments

Hereinbelow, a BS operating in the LTE system will be referred to as an LTE BS and a UE operating in the LTE system will be referred to as an LTE UE. In addition, a BS operating in the NR system will be referred to as an NR BS and a UE operating in the NR system will be referred to as an NR UE.

Hereinbelow, an operation according to the LTE system may be equally applied to the LTE-A system.

As described above, the LTE system and the NR system may operate using different numerologies and different frame structures.

In such a situation, a frequency band used when the LTE BS communicates with the LTE UE and a frequency band used when the NR BS communicates with the NR UE may be equal, may partially overlap, or may be contiguous. The case in which the two frequency bands are contiguous may include the case in which the two frequency bands do not overlap but are in contact with each other or the case in which the two frequency bands do not overlap or are not in contact with each other but the distance therebetween is within a predetermined value.

When frequency bands used by the two systems are the same or contiguous, interference between the systems may occur. Hereinafter, a method of preventing or mitigating interference between the systems through message exchange between BSs is proposed. In addition, a method of performing communication between a BS and a UE in each of the LTE and NR systems based on the exchanged message is proposed.

Hereinafter, message exchange between the LTE system and the NR system will be described. Here, interference may occur even between LTE BSs when the same frequency band or contiguous frequency bands are used. The same problem may also occur between NR BSs. Therefore, the present disclosure is applicable to message exchange between LTE BSs and message exchange between NR BSs.

In consideration of the terms used in the LTE system and the NR system, a frequency band may be replaced with a spectrum, a carrier, or a cell.

The LTE BS may be an eNB or next generation-eNB (ng-eNB). The NR BS may be a gNB.

The LTE BS and the NR BS may be connected to each other through an X2 interface. Alternatively, the LTE BS and the NR BS may be connected to each other through an Xn interface. A new interface may be defined to connect the LTE BS and the NR BS.

The LTE BS and the NR BS may transmit and receive a message including information to be described below using the X2 interface, the Xn interface, or the new interface.

The LTE BS may transmit a message to the NR BS when use of a new frequency band is triggered in the NR BS or when a new cell is connected through dual connectivity in the NR BS.

The message transmitted from the LTE BS to the NR BS may include one or more of information of 3.1 to 3.10 to be described below.

3.1 Small Cell ON/OFF Information

The LTE BS may switch a small cell to an ON state when necessary as in the case in which the UE is present within small cell coverage and maintain the ON state. On the contrary, if the UE does not need to use the small cell as in the case in which the UE is not present within small cell coverage, the LTE BS may switch the small cell to an OFF state and maintain the OFF state.

If the small cell of the LTE BS is turned OFF, the NR BS may use resources that have been occupied by the small cell.

The LTE BS may transmit information about the small cell that is turned off to the NR BS. A message transmitted by the LTE BS to the NR BS may include information about one or more of a carrier and a bandwidth used by the small cell.

When the small cell is turned ON, the NR BS may require information about ON of the small cell. The LTE BS may transmit a message including the information about ON of the small cell to the NR BS. When the LTE BS transmits the message including the information about ON of the small cell to the NR BS, a wired or wireless backhaul network may be used.

If the NR BS receives the message including the information about ON of the small cell from the LTE BS after ON of the small cell is ended, the LTE BS may use a resource region of the small cell before the NR BS avoids using the resource region to be used by the small cell.

Accordingly, a backhaul delay when the LTE BS transmits the message to the NR BS needs to be smaller than a delay required until ON of the small cell is completed. When the LTE BS transmits the message including the information about ON of the small cell to the NR BS, the information about ON of the small cell may be transmitted with a high priority and a lower latency than other information.

3.2 DRS Configuration

A discovery reference signal (DRS) enables the UE to determine ON/OFF of the small cell.

The LTE BS transmits the DRS regardless of ON/OFF of the small cell.

In order to prevent the NR BS from using a resource on which the DRS is transmitted, the LTE BS may transmit, to the NR BS, a message including information (DRS configuration) about the resource on which the LTE BS is to transmit the DRS.

The DRS configuration may include information about a DRS measurement period and a DRS offset. The DRS measurement period may be set in units of time such as 40 ms or 80 ms. The DRS offset may be set to the number of subframes to which the DRS is to be actually transmitted within the measurement period.

Hereinafter, an operation performed by the NR BS in relation to the DRS may be performed by the small cell that is not in an OFF state. Alternatively, the operation may be performed by the small cell except for a primary secondary cell (PSCell).

The NR BS may perform rate matching on resources except for a resource region to which the DRS is to be transmitted, based on the received message. Alternatively, the NR BS may perform rate matching in frequency bands except for all frequency bands in which symbols in which the DRS is to be transmitted are located, based on the received message. Alternatively, the NR BS may perform rate matching in subframes except for all subframes in which the DRS is to be transmitted, based on the received message.

Based on the received message, the NR BS may not transmit and receive a signal to and from the UE in the resource region to which the DRS is to be transmitted. Alternatively, the NR BS may not transmit and receive a signal to and from the UE in all frequency bands in which symbols in which the DRS is to be transmitted are located based on the received message. Alternatively, the NR BS may not transmit and receive a signal to and from the UE in all subframes in which the DRS is to be transmitted, based on the received message.

The DRS may be measured by the UE according to a DRS measurement timing configuration (DMTC). The DMTC may be received through a higher layer (e.g., a radio resource control (RRC) layer).

In order to prevent an incorrect interference level and load level from occurring when the LTE UE receives the DRS, the NR BS may not transmit and receive a signal to and from the UE during a duration in which measurement is performed according to the DMTC. To this end, the message received by the NR BS from the LTE BS may include information about the DMTC.

3.3 MBSFN Configuration

FIG. 4 is a diagram illustrating exemplary subframes that may be configured as multimedia broadcast multicast service single frequency network (MBSFN) subframes in the LTE system.

An MBSFN subframe may be used for a multimedia broadcast multicast service (MBMS). The MBMS is a service that simultaneously transmits the same signal in multiple cells of a wireless communication system. Accordingly, the MBMS has a different mapping method of a reference signal (RS) from unicast in which different data is transmitted in each cell.

The LTE BS informs the UE of the location of a subframe in which an MBMS signal is transmitted and uses RS mapping different from unicast in the corresponding subframe. The UE may receive the MBMS signal in the MBSFN subframe based on information received from the BS.

As described above, when the LTE BS uses the MBSFN subframe for MBMS signal transmission, the NR BS needs to transmit and receive a signal by avoiding a resource used for MBMS signal transmission. To transmit and receive a signal by avoiding the resources used for MBMS signal transmission, the NR BS may receive a message including an MBSFN configuration. The MBSFN configuration may include information about the MBSFN subframe and information indicating that the LTE BS transmits the MBMS signal in the MBSFN subframe. The NR BS may not use resources in the MBSFN subframe for signal transmission and reception to and from the UE, based on the received message.

In addition, in the LTE system, the MBSFN subframe may be configured to prevent the UE from performing unnecessary signal reception (fake MBSFN configuration). A signal/channel such as a PDCCH or a common reference signal (CRS) that should be allocated to every subframe in normal subframes other than the MBSFN subframe may not be allocated to the MBSFN subframe.

Although there is a possibility of malfunction of the UE when an RS is not received in a subframe not configured as the MBSFN subframe, the UE may not perform measurement of the RS in a subframe configured as the MBSFN subframe.

Accordingly, there may be no signal transmission between the LTE BS and the LTE UE in the subframe configured as the MBSFN subframe. The NR BS may receive the message including the MBSFN configuration from the LTE BS. The MBSFN configuration may include information about the MBSFN subframe and information indicating that the LTE BS does not transmit the MBMS signal in the MBSFN subframe. The NR BS may use resources in the MBSFN subframe for signal transmission and reception to and from the UE, based on the received message.

As described above, the MBSFN configuration may include the information about the subframe configured as the MBSFN subframe and the information as to whether the LTE BS transmits the MBMS signal in the MBSFN subframe.

As illustrated in FIG. 4, one or more MBSFN subframes may be present in one radio frame. The LTE BS may divide the one or more MBSFN subframes into subframes in which the MBMS signal is to be transmitted and subframes in which the MBMS signal is not to be transmitted through the message and inform the NR BS of the divided subframes.

The NR BS may discern available subframes based on the received message.

The MBSFN configuration may further include information about the region of a legacy PDCCH allocated to the MBSFN subframe or information about the number of antenna ports configured to transmit the CRS used in the MBSFN subframe.

In the MBSFN subframe, up to two OFDM symbols starting from OFDM symbol index 0 in the first slot in the MBSFN subframe may be a control region to which control channels are allocated. In a subframe other than the MBSFN subframe, up to three OFDM symbols starting from OFDM symbol index 0 in the first slot within the subframe may be the control region to which the control channels are allocated.

Accordingly, the LTE BS may directly inform the NR BS from which symbol the NR BS may use symbols through the MBSFN subframe configuration.

However, the LTE system and the NR system may differ in time length of one symbol. Therefore, the index of a symbol that the NR BS starts to use may be different from the index of a symbol included in the message received from the LTE BS.

In order for the NR BS to use a certain frequency band used in the LTE system, a message including information about the bandwidth of a carrier resource or a center frequency (or carrier center), used by the LTE BS for signal transmission and reception, may be transmitted to the NR BS. The message including the information about the carrier frequency used by the LTE BS may be signaled to the NR BS through an X2 or Xn interface.

3.4 Synchronization Timing (or Synchronization Offset)

When the LTE BS transmits and receives a signal to and from the LTE UE and the NR BS transmits and receives a signal to and from the NR UE, synchronization timings of the respective BSs may be different.

In this case, even if the NR BS receives a message from the LTE BS, there may be a problem in resource usage or avoidance of the NR BS due to a difference between the synchronization timings.

Therefore, in order to establish synchronization between the LTE BS and the NR BS or between LTE RAT and NR, it is necessary to exchange information about synchronization timings.

In order to determine which resource the NR BS will use or avoid, the NR BS may receive a message including information about a synchronization timing from the LTE BS.

Information about a synchronization offset may be exchanged between the LTE BS and the NR BS or between LTE RAT and NR. Information as to whether synchronization has been established between the LTE BS and the NR BS or between LTE RAT and NR may be exchanged therebetween.

Synchronization between the LTE BS and the NR BS or between LTE RAT and NR may be performed based on a global positioning system (GPS). Synchronization between the LTE BS and the NR BS or between LTE RAT and NR may be performed based on a specific BS. Synchronization between the LTE BS and the NR BS or between LTE RAT and NR may be adjustment of synchronization timings for BSs receiving a signal from a specific UE within a certain range, based on the specific UE.

The synchronization timing or synchronization offset may be performed in units of any one of a quantized time (e.g., milliseconds (ms), seconds (s), etc.), a symbol, a subframe, and a frame.

A message for indicating that synchronization is not established between the LTE BS and the NR BS or between LTE RAT and NR may be exchanged therebetween. The message for indicating that synchronization is not established may further include information needed by a specific BS to measure a timing difference with another BS and perform synchronization.

The information needed to measure a timing difference with another BS and perform synchronization may include RS configuration information. The specific BS may calculate a synchronization offset of another BS based on the RS configuration information included in a received message.

When the LTE BS transmits a message to the NR BS, the message may include CRS configuration information. The CRS configuration information may include one or more of the number of antenna ports configured to transmit a CRS and an ID of a cell transmitting the CRS.

When the NR BS transmits a message to the LTE BS, the message may include information about a synchronization signal and PBCH block (SSB). The information about the SSB may include one or more of a transmission period of the SSB, an offset related to the position of the SSB in the frequency domain, and information about a beam used for transmission of the SSB.

The NR BS or LTE BS may perform synchronization or measure the synchronization offset, using information included in a received message.

The NR BS may be one of secondary cells. In this case, the NR BS may perform synchronization with a primary cell in order to use a resource that is being used by the primary cell. Alternatively, the NR BS may measure the synchronization offset and report the measured result to the primary cell.

The NR BS may not use all resources configured as MBSFN subframes by the LTE system according to the synchronization offset. To effectively solve this situation, the numerology of the NR system may be changed. Alternatively, a mini-slot may be configured in the NR system.

P 3.5 Reserved Resource for PRACH or PUCCH

As described with reference to FIG. 1, the UE may perform a random access procedure to complete access to the BS. The UE transmits a random access preamble through a PRACH.

In the LTE system, a random access preamble, i.e., an RACH preamble, consists of a cyclic prefix (CP) of a length $T_{CP}$ and a sequence part of a length $T_{SEQ}$ in a physical layer. $T_{CP}$ and $T_{SEQ}$ depend on a frame structure and a PRACH configuration. A preamble format is controlled by a higher layer. In the LTE system, the PRACH configuration is signaled to the UE through system information and mobility control information of a cell. The PRACH configuration includes information about a root sequence index, a cyclic shift unit NCS of a Zadoff-Chu (ZC) sequence, the length of a root sequence, and a preamble format, which are to be used for an RACH procedure in a cell. In the LTE system, the preamble format, and a PRACH opportunity, which is a timing at which the RACH preamble may be transmitted, are indicated by a PRACH configuration index (refer to Section 5.7 of 3GPP TS 36.211 and "PRACH-Config" of 3GPP TS 36.331). The length of the ZC sequence used for the RACH preamble is determined according to the preamble format.

In the LTE system, the RACH preamble is transmitted in a UL subframe. Transmission of the RACH preamble is restricted to certain time and frequency resources. These resources are called PRACH resources and are indexed in increasing order of subframe numbers within a radio frame and PRBs in the frequency domain. Index 0 corresponds to the lowest numbered subframe within the radio frame and the lowest PRB in the frequency domain.

The PRACH resources are defined according to PRACH configuration indexes (see 3GPP TS 36.211). The PRACH configuration indexes may be transmitted by the BS to the UE through a higher layer signal.

After completing the random access procedure using the PRACH resources, the UE may transmit a PUCCH as a normal UL signal transmission procedure.

FIG. 5 illustrates the structure of a UL subframe that may be used in embodiments of the present disclosure.

Referring to FIG. 5, the UL subframe in the LTE system may be divided into a control region and a data region in the frequency domain. A PUCCH carrying UL control information is allocated to the control region and a PUSCH carrying user data is allocated to the data region. To maintain a single carrier property, one UE does not simultaneously transmit the PUCCH and the PUSCH. An RB pair in the subframe is allocated to the PUCCH for the UE. RBs belonging to the RB pair occupy different subcarriers in two slots. It is said that the RB pair allocated to the PUCCH frequency-hops over a slot boundary.

UCI may be periodically transmitted through the PUCCH. The UCI may also be aperiodically transmitted through the PUCCH acceding to the configuration of the BS.

The LTE BS may transmit, to the NR BS, a message including information about a resource (or resource region) used to receive the PRACH or PUCCH from the LTE UE. The information about the resource used to receive the PRACH or PUCCH may be in the form of a reserved resource. The reserved resource may be a periodic resource. Alternatively, the LTE BS may transmit a message including information about an aperiodic resource and the reserved resource in the form in which the aperiodic resource is repeated to the NR BS.

The NR BS may transmit and receive a signal to and from the NR UE by avoiding the reserved resource based on the received message.

In addition, a resource used by the NR UEs in the random access procedure (NR RACH resource) and a resource used by the LTE UEs in the random access procedure (LTE RACH resource) may be differently configured.

When the LTE BS and the NR BS are located in different places, there is a difference between time that a signal transmitted by the NR UE reaches the LTE BS and time that the signal transmitted by the NR UE reaches the NR BS. As a result, the signal transmitted by the NR UE may cause interference at a subframe boundary of the LTE BS.

In order to prevent or mitigate this interference, the LTE BS may discern a timing advance (TA) value of the NR UE and transmit a message including the discerned TA value to the NR BS. The LTE BS may be aware of the TA value of the NR UE through the NR RACH resource and the LTE RACH resource. The NR BS may directly discern the TA value of the LTE UE through the NR RACH resource and the LTE RACH resource.

If there is a plurality of NR UEs, the LTE BS may discern TA values of the respective NR UEs and transmit all the discerned TA values to the NR BS.

Alternatively, the LTE BS may calculate an average value (TA average value) of the TA values for the plural NR UEs and transmit the average value of the TA values to the NR UEs or the NR BS.

Alternatively, the LTE BS may transmit one or more of a maximum value (TA maximum value) and a minimum value (TA minimum value) among the TA values of the plural NR UEs to the NR UEs or the NR BS.

A maximum value or a minimum value of an interference region generated due to a difference between TA values of the LTE BS and the NR BS may be calculated based on the TA maximum value or the TA minimum value.

The NR UE may receive one or more of the TA values, the TA average value, the TA maximum value, and the TA minimum value from the LTE BS and transmit the received values to the NR BS.

When the NR BS desires to communicate with the NR UE by avoiding the reserved resource used by the LTE BS in an LTE frequency band, the NR BS may consider one or more of the TA values, the TA average value, the TA maximum value, and the TA minimum value. In addition, the NR BS may shift a frame boundary in consideration of one or more of the TA values, the TA average value, the TA maximum value, and the TA minimum value so as to mitigate interference. In addition to the frame boundary, a subframe boundary or a slot boundary may be shifted.

In addition, when the NR BS desires to avoid the reserved resource used by the LTE BS in the LTE frequency band, the NR BS may further consider the maximum value or the minimum value of the interference region. The maximum value or the minimum value of the interference region may also be considered even when the NR BS configures a PRACH or PUCCH resource for the NR UE.

In addition, the TA values may be required when interference occurs between UEs. The NR UE may detect whether there is an LTE UE generating interference, based on a UL signal (e.g., a sounding reference signal (SRS)) transmitted by the LTE UE.

A resource not used by the NR system among resources used by the LTE UE to transmit a UL signal may be configured as an interference measurement resource (IMR). The NR UE may measure interference on the IMR. As a result of interference measurement on the IMR by the NR UE, if an interference level is equal to or greater than a threshold value, the NR UE may cause the NR system to consider TA values for detected UEs.

According to the TA values of the detected UEs (for example, when the TA values of the detected UEs are greater than a predetermined level), UL signal transmission of the detected UEs may deteriorate the quality of DL signal reception of the NR UE. The NR system may prevent or mitigate interference to which the NR UE is subjected using a modulation and coding scheme (MCS) or data puncturing.

The above-described operation may be applied to a resource used for a scheduling request (SR) as well as to the PRACH and the PUCCH.

3.6 SRS Configuration

FIG. 6 illustrates the structure of an SRS transmission region in a UL subframe that may be used in the LTE system.

In the LTE system, as illustrated in FIG. 6, an SRS may be transmitted through an SC-FDMA symbol which is located at the last part on the time axis in one subframe. SRSs of multiple UEs transmitted in the last SC-FDMA symbol of the same subframe may be distinguished according to frequency positions/sequences.

In the LTE system, the SRS may be periodically transmitted. Configuration for periodic transmission of the SRS is received by cell-specific SRS parameters and UE-specific SRS parameters. The cell-specific SRS parameters (or cell-specific SRS configuration) and the UE-specific SRS parameters (or UE-specific SRS configuration) are transmitted to the UE through higher layer (e.g., RRC layer) signaling.

The cell-specific SRS parameters include srs-BandwidthConfig and srs-SubframeConfig. srs-BandwidthConfig indicates information about a frequency bandwidth in which the SRS may be transmitted and srs-SubframeConfig indicates information about a subframe in which the SRS may be transmitted. The subframe in which the SRS may be transmitted in a cell is periodically configured in a frame. Table 5 shows srs-SubframeConfig among the cell-specific SRS parameters.

TABLE 5

| srs-SubframeConfig | Binary | Configuration Period $T_{SFC}$ (subframes) | Transmission offset $\Delta_{SFC}$ (subframes) |
|---|---|---|---|
| 0 | 0000 | 1 | (0) |
| 1 | 0001 | 2 | (0) |
| 2 | 0010 | 2 | (1) |
| 3 | 0011 | 5 | (0) |
| 4 | 0100 | 5 | (1) |
| 5 | 0101 | 5 | (2) |
| 6 | 0110 | 5 | (3) |
| 7 | 0111 | 5 | (0, 1) |
| 8 | 1000 | 5 | (2, 3) |
| 9 | 1001 | 10 | (0) |
| 10 | 1010 | 10 | (1) |
| 11 | 1011 | 10 | (2) |
| 12 | 1100 | 10 | (3) |
| 13 | 1101 | 10 | (0, 1, 2, 3, 4, 6, 8) |
| 14 | 1110 | 10 | (0, 1, 2, 3, 4, 5, 6, 8) |
| 15 | 1111 | reserved | Reserved |

$T_{SFC}$ denotes a cell-specific subframe configuration and $\Delta_{SFC}$ denotes a cell-specific subframe offset. srs-SubframeConfig is provided by a higher layer (e.g., RRC layer). An SRS is transmitted through a subframe satisfying $\lfloor n_s/2 \rfloor$ mod $T_{SFC} \in \Delta_{SFC}$. nS denotes a slot index. $\lfloor \ \rfloor$ denotes a flooring function and 'mod' denotes a modulo operation.

The UE-specific SRS parameters include srs-Bandwidth, srs-HoppingBandwidth, freqDomainPosition, srs-ConfigIndex, transmissionComb, and cyclicShift. srs-Bandwidth represents a value used to configure a frequency bandwidth in which the UE should transmit the SRS. srs-HoppingBandwidth represents a value used to configure frequency hopping of the SRS. FreqDomainPosition represents a value used to determine a frequency position at which the SRS is transmitted. srs-ConfigIndex represents a value used to configure a subframe in which the UE should transmit the SRS. transmissionComb represents a value used to configure an SRS transmission comb. cyclicShift represents a value used to configure a CP value applied to an SRS sequence.

Tables 6 and 7 show an SRS transmission periodicity and a subframe offset according to srs-ConfigIndex. The SRS transmission periodicity indicates a time interval (unit, subframe, or ms) at which the UE should periodically transmit the SRS. Table 6 shows the SRS transmission periodicity and the subframe offset for FDD and Table 7 shows the SRS transmission periodicity and the subframe offset for TDD. An SRS configuration index Isis is signaled to each UE and each UE checks the SRS transmission periodicity $T_{SRS}$ and the SRS subframe offset $T_{offset}$ using the SRS configuration index Isis.

TABLE 6

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 7

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

In summary, in the LTE system, the cell-specific SRS parameters indicate a subframe occupied for SRS transmission in a cell to the UE and the UE-specific SRS parameters represent a subframe that the UE will actually use among subframes occupied for the SRS. The UE periodically transmits the SRS through a specific symbol (e.g., the last symbol) of a subframe designated by the UE-specific SRS parameters.

The NR BS may be aware of the SRS configuration of the LTE system, which may be configured as described above, and perform signal transmission and reception by avoiding a resource used for SRS transmission in LTE.

Alternatively, the LTE BS may configure a resource on which the SRS is to be transmitted such that the LTE BS does not actually transmit the SRS (fake SRS configuration) and the NR BS may transmit and receive a signal on a resource on which the LTE BS is to transmit the SRS.

The LTE BS may transmit a message including the cell-specific SRS configuration to the NR BS. The cell-specific SRS configuration may include information about a resource that the LTE BS configures to receive the SRS.

In addition, the LTE BS may transmit a message including all UE-specific SRS configurations to the NR BS. The UE-specific SRS configurations may include information about resources that each LTE UE is to actually use for SRS transmission.

The NR BS may use resources except for resources included in all the UE-specific SRS configurations among resources included in the cell-specific SRS configuration.

Alternatively, the LTE BS may transmit a message including the cell-specific SRS configuration and information about resources to be periodically used for actual SRS transmission to the NR BS. The NR BS may use resources except the resources that are to be periodically used for SRS transmission.

Alternatively, the LTE BS may transmit a message including the cell-specific SRS configuration, information about aperiodic resources to be used for actual SRS transmission, and information about a unit in which the aperiodic resources are repeated to the NR BS. The NR BS may use resources except for the aperiodic resources.

3.7 TDD UL/DL Configuration

The structure of a type 2 radio frame of the LTE system, i.e., UL/DL subframe configuration in an LTE TDD system (TDD UL/DL configuration) is shown in Table 8 below.

TABLE 8

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 8, D denotes a DL subframe, U denotes a UL subframe, and S denotes a special subframe. In addition, Table 8 shows a DL-UL switching periodicity in each UL/DL subframe configuration.

In this case, if the NR BS is aware of the TDD UL/DL configuration of the LTE system, the NR BS may be aware of which duration is UL or DL among resources used by an adjacent LTE BS and perform signal transmission and reception in consideration of the recognized UL or DL duration.

The LTE BS may transmit a message including the TDD UL/DL configuration to be used thereby to the NR BS.

The LTE BS may transmit a message including a special subframe configuration shown in Table 1 to the NR BS. As shown in Table 1, DwPTS and UpPTS durations vary according to the special subframe configuration. To clearly identify a UL/DL duration used by the LTE BS, the NR BS may receive the message including the special subframe configuration from the LTE BS.

In addition, an embodiment of the present disclosure may be extended and applied even when resources according to the TDD UL/DL configuration are dynamically changed according to a load state of the system. The LTE BS may indicate information about a set of subframes to be protected among TDD UL/DL subframes of LTE for an operation related to dynamic change of the TDD UL/DL configuration.

3.8 Maximum PDCCH Region

FIG. 7 illustrates the structure of a DL subframe that may be used in the LTE system.

Referring to FIG. 7, up to three OFDM symbols starting from OFDM symbol index 0 in the first slot of a subframe are a control region to which control channels are allocated and the remaining OFDM symbols are a data region to which PDSCHs are allocated. Examples of DL control channels used in 3GPP LTE include a physical control format indicator channel (PCFICH), a PDCCH, and a physical hybrid-ARQ indicator channel (PHICH).

The PCFICH is transmitted in the first OFDM symbol of a subframe and carries information about the number of OFDM symbols (i.e., the size of a control region) used for transmission of control channels in the subframe. The PHICH is a response channel for UL and carries an acknowledgement (ACK)/negative acknowledgement (NACK) signal for a hybrid automatic repeat request (HARQ). Control information transmitted through the PDCCH is called downlink control information (DCI). The DCI includes UL resource allocation information, DL resource allocation information, or a UL transmission (Tx) power control command for a certain UE group.

In this case, the NR system needs not to use a region in which the PDCCH is transmitted in the LTE system. The NR BS may receive, from the LTE BS, a message including information about a resource region used by the LTE BS for PDCCH transmission.

In the LTE system, the region in which the PDCCH is transmitted may vary in every subframe. To protect the PDCCH transmission region used in the LTE system, the NR BS needs to be aware of information about a maximum region (maximum PDCCH region) in which the PDCCH may be transmitted in the LTE system.

When the LTE BS transmits a message including the information about the maximum PDCCH region to the NR BS, the maximum PDCCH region may be a region common to both an MBSFN subframe and a non-MBSFN subframe. Alternatively, the maximum PDCCH region may be a maximum PDCCH region in the MBSFN subframe and may be a maximum PDCCH region in the non-MBSFN subframe.

If an interface is configured between the NR BS and the LTE BS through an ideal backhaul, the LTE BS may transmit, to the NR BS, a message including information about a PDCCH region, which is changed in every subframe, rather than the maximum PDCCH region.

3.9 CRS Antenna Port

In the LTE system, a common reference signal (CRS) may be defined for a unicast service. The CRS is used for information acquisition for a channel state and measurement for handover and may be referred to as cell-specific RS. In the LTE system, the CRS may be used for two purposes of channel information acquisition and data demodulation.

The CRS is a cell-specific RS and is transmitted in every subframe for a wideband. The CRS may be transmitted according to the number of transmit antennas of the BS. For example, if the number of transmit antennas of the BS is two, CRSs for antenna ports 0 and 1 are transmitted, and if the number of transmit antennas is four, CRSs for antenna ports 0 to 3 are transmitted.

FIG. 8 is a diagram illustrating a pattern of CRSs included in one subframe (14 OFDM symbols in time×12 subcarriers in frequency, for a normal CP) in a system in which a BS supports four transmit antennas. In FIG. 8, REs denoted by 'R0', 'R1', 'R2', and 'R3' indicate positions of CRSs for antenna port indexes 0, 1, 2, and 3, respectively.

In the LTE-A system, up to 8 transmit antennas may be supported on DL. Therefore, in the LTE-A system, CRSs for up to 8 transmit antennas may be supported.

The CRS pattern of FIG. 8 is purely exemplary and the operation of the present disclosure is not limited to the CRS pattern illustrated in FIG. 8. That is, the following operation may be performed even when a CRS pattern different from the CRS pattern illustrated in FIG. 8 is defined and used.

In the LTE system, CRSs are transmitted in all subframes. However, the number and pattern of CRSs may vary according to the number of antennas used as described above. In addition, the positions of resources on which CRSs are transmitted vary according to the number of antenna ports.

Therefore, in order to transmit and receive a signal by avoiding a resource on which the CRS is transmitted in the LTE system, the NR BS needs to be aware of the number of antenna ports used for CRS transmission (CRS antenna ports) used by the LTE BS. The LTE BS may transmit a message including information about the number of CRS antenna ports to the NR BS.

Hereinafter, an operation performed by the NR BS in relation to the CRS may be performed by the LTE BS except for a BS transmitting the CRS.

The NR BS may perform rate matching on resources except for a resource region to which the CRS is to be transmitted, based on the received message. Alternatively, the NR BS may perform rate matching in frequency bands except for all frequency bands in which symbols in which the CRS is to be transmitted are located, based on the received message. Alternatively, the NR BS may perform rate matching in subframes except for all subframes in which the CRS is to be transmitted, based on the received message.

Based on the received message, the NR BS may not transmit and receive a signal to and from the UE in the resource region to which the CRS is to be transmitted. Alternatively, the NR BS may not transmit and receive a signal to and from the UE in all frequency bands in which symbols in which the CRS is to be transmitted are located based on the received message. Alternatively, the NR BS may not transmit and receive a signal to and from the UE in all subframes in which the CRS is to be transmitted, based on the received message.

3.10 ZP/NZP CSI-RS Configuration

FIG. 9 is a diagram illustrating exemplary channel state information-reference signal (CSI-RS) patterns defined in the LTE system. FIG. 9 illustrates the positions of REs in which CSI-RSs are transmitted in one subframe (14 OFDM symbols in time x 12 subcarriers in frequency, for a normal CP) in which DL data is transmitted. In any DL subframe, one of the CSI-RS patterns of FIGS. 9(a) to 9(e) may be used. The CSI-RSs may be transmitted for 8 antenna ports (antenna port indexes 15, 16, 17, 18, 19, 20, 21, and 22) that are additionally defined in the LTE-A system. CSI-RSs for different antenna ports may be distinguished by being located on different frequency resources (subcarriers) and/or different time resources (OFDM symbols) (i.e., may be multiplexed by FDM and/or TDM). CSI-RSs for different antenna ports located on the same time-frequency resource may be distinguished by orthogonal codes (i.e., may be multiplexed by CDM). In an example of FIG. 9(a), CSI-RSs for antenna ports 15 and 16 may be located in REs indicated as CSI-RS CDM group 1 and these CSI-RSs may be multiplexed by the orthogonal codes. In the example of FIG. 9(a), CSI-RSs for antenna ports 17 and 18 may be located in REs indicated as CSI-RS CDM group 2 and these CSI-RSs may be multiplexed by the orthogonal codes. In the example of FIG. 9(a), CSI-RSs for antenna ports 19 and 20 may be located in REs indicated as CSI-RS CDM group 3 and these CSI-RSs may be multiplexed by the orthogonal code. In the example of FIG. 9(a), CSI-RSs for antenna ports 21 and 22 may be located in REs indicated as CSI-RS CDM group 4 and these CSI-RSs may be multiplexed by the orthogonal codes. The same principle described with reference to FIG. 9(a) may be applied to FIGS. 9(b) to 9(e).

Figure 10:
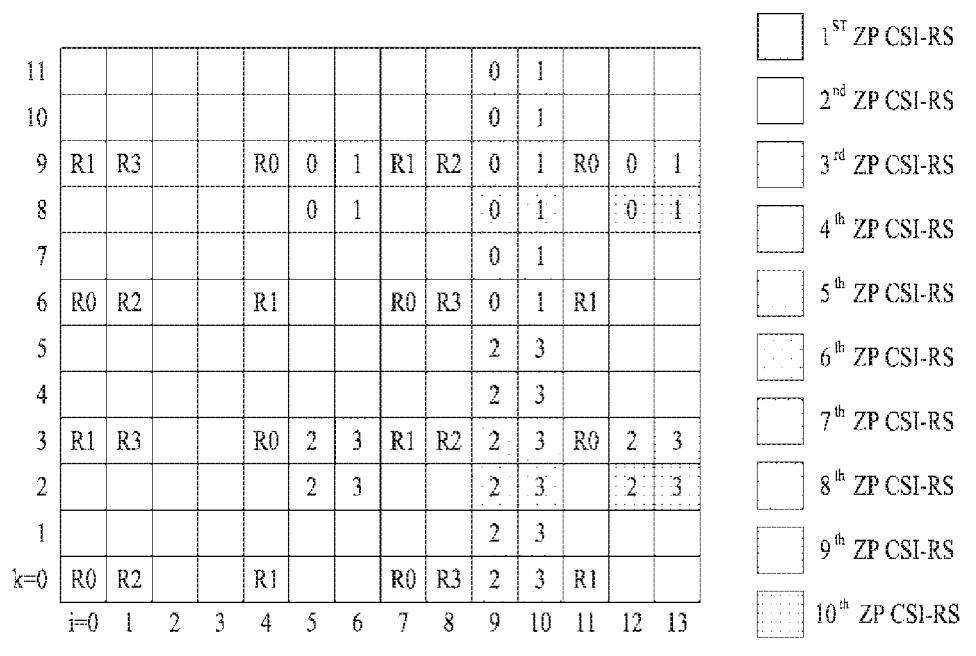

FIG. 10 is a diagram illustrating an exemplary zero power (ZP) CSI-RS pattern defined in the LTE-A system. A ZP CSI-RS is used for broadly two usages. The first usage is to improve CSI-RS performance. That is, one network may mute a CSI-RS RE of another network to improve CSI-RS measurement performance of the other network. Then, the network may configure the muted RE as the ZP CSI-RS, so that the UE thereof may correctly perform rate matching, and inform the UE thereof of the ZP CSI-RS. The second usage of the ZP CSI-RS is to measure interference for coordinated multi-point (CoMP) CQI calculation. That is, a part of networks may mute the ZP CSI-RS RE and the UE may measure interference from the ZP CSI-RS to calculate CoMP CQI.

The CSI-RS patterns of FIGS. 9 and 10 are purely exemplary and the operation of the present disclosure is not limited to the CSI-RS patterns illustrated in FIGS. 9 and 10. That is, the following operation may be performed even when CSI-RS patterns different from those of FIGS. 9 and 10 are defined and used.

Through the information about the CSI-RS configuration of the LTE system, which may be configured as described above, the NR BS may perform signal transmission and reception by avoiding a resources on which the CSI-RS is transmitted.

Hereinafter, an operation performed by the NR BS in association with the CSI-RS may be performed by the LTE BS except for BSs using the CSI-RS.

The NR BS may perform rate matching on resources except for a resource region to which the CSI-RS is to be transmitted, based on the received message. Alternatively, the NR BS may perform rate matching in frequency bands except for all frequency bands in which symbols in which the CSI-RS is to be transmitted are located, based on the received message. Alternatively, the NR BS may perform rate matching in subframes except for all subframes in which the CSI-RS is to be transmitted, based on the received message.

Based on the received message, the NR BS may not transmit and receive a signal to and from the UE in the resource region to which the CSI-RS is to be transmitted. Alternatively, the NR BS may not transmit and receive a signal to and from the UE in all frequency bands in which symbols in which the CSI-RS is to be transmitted are located based on the received message. Alternatively, the NR BS may not transmit and receive a signal to and from the UE in all subframes in which the CSI-RS is to be transmitted, based on the received message.

When the NR BS and the LTE BS use adjacent frequency bands other than the same or overlapping frequency band, a message including the information about the synchronization timing and the information about the TDD UL/DL configuration among the above-described information included in the message transmitted by the LTE BS to the NR BS may be transmitted.

The NR BS may prevent interference generated when the NR BS and the LTE BS transmit signals of opposite links in adjacent bands, based on a synchronization timing and a UL/DL signal transmission timing of the LTE BS.

In the case of signals/channels transmitted by the BS to the UE through a DL signal, such as a CRS, a DRS, a CSI-RS, or a PDCCH, the BS is previously aware of locations at which the corresponding signals/channels will be transmitted. The BS may define resources on which the CRS, the DRS, the CSI-RS, or the PDCCH will be transmitted as a resource reservation interval or a reserved resource region of a symbol unit or multiple symbol units. The BS may transmit a message including information about the resource reservation interval to another BS.

The BS may define the resource reservation interval for each of the CRS, the DRS, the CSI-RS, and the PDCCH. Alternatively, the BS may define the resource reservation interval for two or more of the CRS, the DRS, the CSI-RS and the PDCCH. Alternatively, the BS may define the resource reservation interval for RSs and the resource reservation interval for the PDCCH.

The LTE BS may define, in units of symbols, slots, subframes, or frames, resources determined to be usable by the NR BS among frequency bands used by the LTE BS. The LTE BS may transmit a message including information about the resources determined to be usable by the NR BS to the NR BS.

The LTE BS may define, in units of symbols, slots, subframes, or frames, resources determined not to be usable by the NR BS among the frequency bands used by the LTE BS. The LTE BS may transmit a message including information about the resources determined not to be usable by the NR BS to the NR BS.

The NR BS may transmit the information included in the received message to the UE. The information included in the received message may be transmitted from the BS to the UE through higher layer signaling (e.g., RRC signaling). The NR UE may consider the information received from the NR BS upon transmitting a UL signal or receiving a DL signal.

The NR BS may be aware of the amount of resources usable thereby in the LTE frequency bands through the information included in the message received from the LTE BS.

However, the amount of resources usable by the NR BS, included in the information received from the LTE BS, may be greater than the amount of resources necessary for the NR BS to transmit and receive a signal to and from the NR UE. In this case, the NR BS may inform the LTE BS of a message including information about resources to be used for signal transmission and reception to and from the NR UE.

The LTE BS may allocate a UL or DL resource for the LTE UE based on the message received from the NR BS. In this case, the LTE BS may predict which degree of interference will occur on which resource based on the information about the resource that the NR BS will use for signal transmission and reception to and from the NR UE, included in the message received from the NR BS.

FIG. 11 is a conceptual diagram of a signal reception method according to embodiments of the present disclosure.

Referring to FIG. 11, the embodiments of the present disclosure may include receiving, by a BS, a message including information associated with another BS from the other BS (S1101) and communicating with a UE in a specific frequency band based on the information associated with the other BS (S1103).

The BS may allocate a resource on which a UL or DL signal will be transmitted or received to or from the UE based on the information associated with the other BS and transmit an indication of the allocated resource (e.g., UL grant or DL grant) to the UE.

The BS may transmit a message including information about the resource allocated for communication with the UE to the other BS.

The specific frequency band may be a frequency band included in a frequency band used by the other BS or may be a frequency band adjacent to the frequency band used by the other BS.

The information associated with the other BS may include one or more of: information about ON and OFF of a small cell connected to the other BS; information about one or more of a discovery reference signal (DRS) configuration, a multimedia broadcast multicast service single frequency network (MBSFN) configuration, a sounding reference signal (SRS) configuration, a time division duplex (TDD) uplink/downlink (UL/DL) configuration, the number of common reference signal (CRS) antenna ports, and a channel state information-reference signal (CSI-RS) configuration of the other BS; information about a synchronization timing or a synchronization offset between the BS and the other BS; information about one or more of a physical random access channel (RACH) resource region, a physical uplink control channel (PUCCH) resource region, and a physical downlink control channel (PDCCH) resource region, allocated by the other BS; and information related to a timing advance (TA) value of the UE, measured by the other BS.

The information associated with the other BS may include information about a reserved resource region arbitrarily defined by the other BS.

The information associated with the other BS may include one or more of information about a resource to be usable by the BS, determined by the other BS, and information about a resource not to be usable by the BS, determined by the other BS.

The BS may transmit a message received from the other BS to the UE.

4. Device Configuration

FIG. 12 is a diagram illustrating the configurations of a UE and a BS for implementing the proposed embodiments. The UE and the BS illustrated in FIG. 12 are implemented to perform the embodiments of the above-described method of transmitting a UL signal between a UE and a BS.

The UE 1 may act as a transmission end in UL and a reception end in DL. The BS (eNB or gNB) 100 may act as a reception end in UL and a transmission end in DL.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure and a memory 50/150 for temporarily or permanently storing operations of the processor 40/140.

With the above-described configuration, the BS 100 performs signal transmission and reception through the processor 140 using a plurality of distributed antennas. Specifically, the BS may control the plurality of distributed antennas to perform UL channel quality measurement using an SRS received from the UE. Then, the BS may receive UL CQI from the plurality of distributed antennas and then select a distributed antenna to communicate with the UE based on the received UL CQI. Thereafter, the BS may transmit information on the selected distributed antenna to the UE through at least one of the plurality of distributed antennas.

The transmitter and receiver of each of the UE and BS may perform packet modulation/demodulation for data transmission, high-speed packet channel coding, OFDMA packet scheduling, TDD packet scheduling, and/or channel multiplexing. Each of the UE and BS of FIG. 12 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) UE, etc.

The smart phone is a UE taking the advantages of both a mobile phone and a PDA. It incorporates the functions of a PDA, that is, scheduling and data communications such as fax transmission and reception and Internet connection into a mobile phone. The MB-MM UE refers to a UE which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, 3GPP 5G NR system and/or a 3GPP2 system. Besides these wireless access systems, the embodiments of the present disclosure are applicable to all technical fields in which the wireless access systems find their applications.

The invention claimed is:

1. A method of transmitting and receiving a signal by a base station (BS) in a wireless communication system, the method comprising:
receiving a message including information associated with another BS from the other BS; and
communicating with a user equipment (UE) in a specific frequency band based on the information associated with the other BS,
wherein the specific frequency band is a frequency band included in a frequency band used by the other BS or is a frequency band adjacent to the frequency band used by the other BS,
wherein the information the associated with the other BS includes:
information about ON and OFF of a small cell connected to the other BS;
information about a discovery reference signal (DRS) configuration of the other BS; and
information about a channel state information-reference signal (CSI-RS) configuration of the other BS,
wherein the information about ON and OFF is transmitted before the information about the DRS configuration and the information about the CSI-RS configuration,
wherein, based on the information about the DRS configuration, the specific frequency band is not used for the communicating with the UE by the BS in a subframe in which a DRS of the other BS is located, and
wherein, based on the information about the CSI-RS configuration, the specific frequency band is not used for the communicating with the UE by the BS in a subframe in which a CSI-RS of the other BS is located.

2. The method of claim 1, wherein the information associated with the other BS includes one or more of:
information about one or more of a multimedia broadcast multicast service single frequency network (MBSFN) configuration, a sounding reference signal (SRS) configuration, a time division duplex (TDD) uplink/downlink (UL/DL) configuration, or the number of common reference signal (CRS) antenna ports;
information about a synchronization timing or a synchronization offset between the BS and the other BS;
information about one or more of a physical random access channel (RACH) resource region, a physical uplink control channel (PUCCH) resource region, or a physical downlink control channel (PDCCH) resource region, allocated by the other BS; or
information related to a timing advance (TA) value of the UE, measured by the other BS.

3. The method of claim 1, wherein the information associated with the other BS includes information about a reserved resource region defined by the other BS.

4. The method of claim 1, wherein the information associated with the other BS includes one or more of information about a resource determined by the other BS to be usable by the BS or information about a resource determined by the other BS not to be usable by the BS.

5. The method of claim 1, further comprising transmitting a message including the information associated with the other BS to the UE.

6. The method of claim 1, further comprising transmitting a message including information about a resource to be used for communication with the UE to the other BS.

7. A base station (BS) for transmitting and receiving a signal in a wireless communication system, the BS comprising:
a transmitter and a receiver; and
a processor,
wherein the processor:
controls the receiver to receive a message including information associated with another BS from the other BS, and
controls the transmitter or receiver to communicate with a user equipment (UE) in a specific frequency band based on the information associated with the other BS,
wherein the specific frequency band is a frequency band included in a frequency band used by the other BS or is a frequency band adjacent to the frequency band used by the other BS,
wherein the information the associated with the other BS includes:
information about ON and OFF of a small cell connected to the other BS;
information about a discovery reference signal (DRS) configuration of the other BS; and
information about a channel state information-reference signal (CSI-RS) configuration of the other BS,
wherein the information about ON and OFF is transmitted before the information about the DRS configuration and the information about the CSI-RS configuration,
wherein, based on the information about the DRS configuration, the specific frequency band is not used for the communicating with the UE by the BS in a subframe in which a DRS of the other BS is located, and
wherein, based on the information about the CSI-RS configuration, the specific frequency band is not used for the communicating with the UE by the BS in a subframe in which a CSI-RS of the other BS is located.

8. The BS of claim 7, wherein the information associated with the other BS includes one or more of:
information about one or more of a multimedia broadcast multicast service single frequency network (MBSFN) configuration, a sounding reference signal (SRS) configuration, a time division duplex (TDD) uplink/downlink (UL/DL) configuration, or the number of common reference signal (CRS) antenna ports;
information about a synchronization timing or a synchronization offset between the BS and the other BS;
information about one or more of a physical random access channel (RACH) resource region, a physical uplink control channel (PUCCH) resource region, or a physical downlink control channel (PDCCH) resource region, allocated by the other BS; or
information related to a timing advance (TA) value of the UE, measured by the other BS.

9. The BS of claim 7, wherein the information associated with the other BS includes information about a reserved resource region defined by the other BS.

10. The BS of claim 7, wherein the information associated with the other BS includes one or more of information about a resource determined by the other BS to be usable by the BS or information about a resource determined by the other BS not to be usable by the BS.

11. The BS of claim 7, wherein the processor controls the transmitter to transmit a message including the information associated with the other BS to the UE.

12. The BS of claim 7, wherein the processor controls the transmitter to transmit a message including information about a resource to be used for communication with the UE to the other BS.

13. A method of transmitting and receiving a signal by a user equipment (UE) in a wireless communication system, the method comprising:
  receiving an indication of a resource to be used for communication with a base station (BS) from the BS; and
  communicating with the BS in a specific frequency band based on the indication of the resource to be used for communication with the BS,
  wherein the resource to be used for communication with the BS is determined based on a message including information associated with another BS,
  wherein the specific frequency band is a frequency band included in a frequency band used by the other BS or is a frequency band adjacent to the frequency band used by the other BS,
  wherein the information the associated with the other BS includes:
    information about ON and OFF of a small cell connected to the other BS;
    information about a discovery reference signal (DRS) configuration of the other BS; and
    information about a channel state information-reference signal (CSI-RS) configuration of the other BS,
  wherein the information about ON and OFF is transmitted before the information about the DRS configuration and the information about the CSI-RS configuration,
  wherein, based on the information about the DRS configuration, the specific frequency band is not used for the communicating with the UE by the BS in a subframe in which a DRS of the other BS is located, and
  wherein, based on the information about the CSI-RS configuration, the specific frequency band is not used for the communicating with the UE by the BS in a subframe in which a CSI-RS of the other BS is located.

14. The method of claim 1, wherein the UE is capable of communicating with at least one of another UE, a UE related to an autonomous driving vehicle, a base station and/or a network.

15. The method according to claim 13, wherein the UE is capable of communicating with at least one of another UE, a UE related to an autonomous driving vehicle, a base station and/or a network.

* * * * *